Oct. 27, 1936. B. P. LAYNE 2,058,471
PISTON RING
Filed Dec. 23, 1933
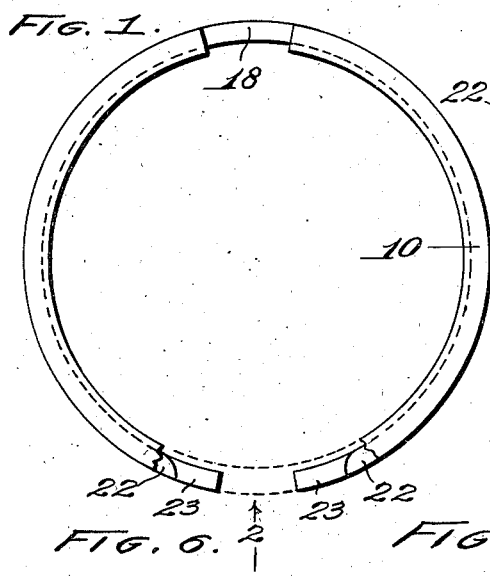
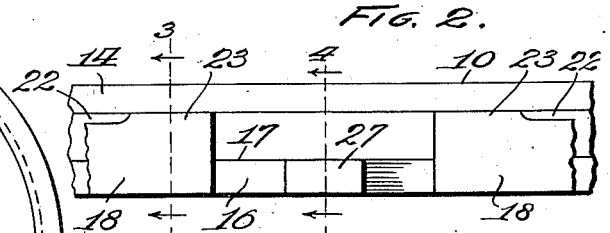
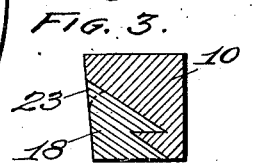
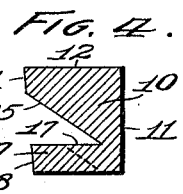
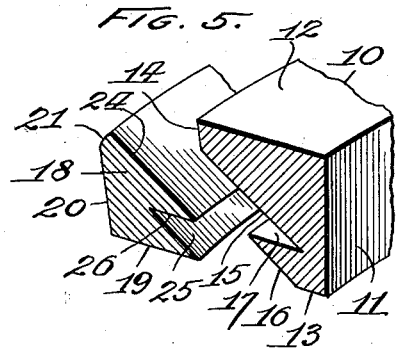
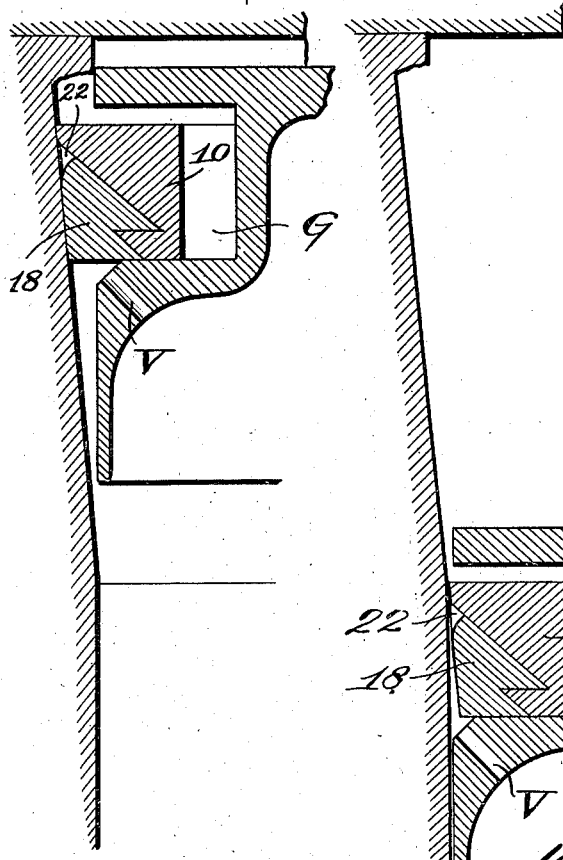
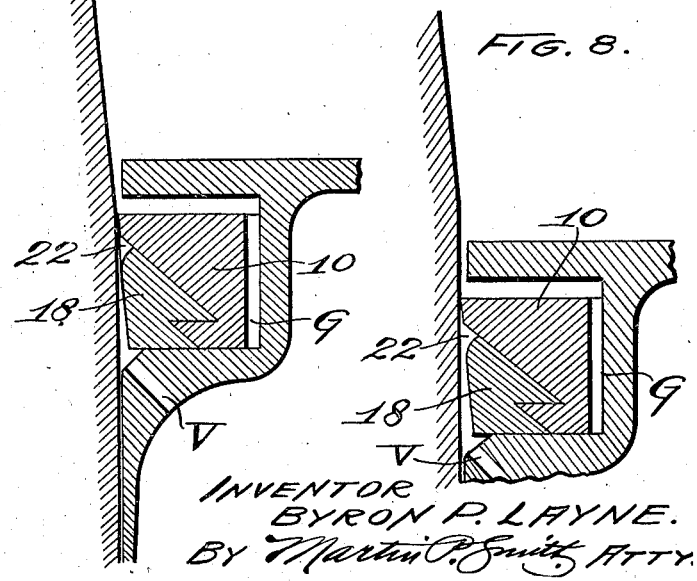
INVENTOR
BYRON P. LAYNE.
BY Martin P. Smith, ATTY.

Patented Oct. 27, 1936

2,058,471

UNITED STATES PATENT OFFICE 2,058,471

PISTON RING

Byron P. Layne, Los Angeles, Calif.

Application December 23, 1933, Serial No. 703,721

3 Claims. (Cl. 309—25)

My invention relates to piston rings and has for its principal object, the provision of a relatively simple, practical and inexpensive two-piece packing ring that is especially designed for installation in the pistons of cylinders that have been in use for some time and the upper portions of the piston chambers of which cylinders have become worn or tapered to such an extent as to materially decrease the efficiency of the engine.

In the replacement of piston rings in pistons that have been in operation for some time, it will be found that the upper portions of the cylinder walls surrounding the piston chambers have become worn to such a degree as that the diameters of the piston chambers gradually increase toward their upper ends, such condition being the result of continued wear upon the cylinder walls by the piston rings and this condition is aggravated, due to the presence of intense heat in the upper portions of the piston chambers and further, by reason of the presence of free carbon within the combustion chambers which free carbon exerts a grinding effect upon the walls of the piston chambers so that after certain periods of service the upper portions of the piston chamber become tapered with gradually increasing diameters toward their upper ends.

In order to maintain the desired degree of engine efficiency, it is the present practice to rebore the cylinders when the upper portions of the piston chambers have become tapered as a result of excessive wear in their upper portions, but such practice is expensive and it is the principal object of my invention, to provide replacement piston rings that will function in cylinders having worn or tapered piston chambers so as to maintain the desired engine efficiency with a replacement cost that is much less than the expense of reboring the engine cylinders.

A further object of my invention is, to provide a piston ring of the character referred to that is formed in two parts that are associated so as to permit radial expansion and contraction of the ring as the same passes through the worn or tapered portion of the piston chamber and the two parts of the ring being united by a joint that effectually prevents movement or separation of the two parts of the ring vertically with respect to each other or with respect to the axis of the piston in which the rings are positioned.

With the foregoing and other objects in view my invention consists in certain novel features of construction and arrangements of parts that will be hereinafter more fully described and claimed and illustrated in the accompanying drawing in which:

Fig. 1 is a top plan view of a piston ring constructed in accordance with my invention, with a portion of the upper or inner ring broken away to show the end portions of the lower or outer ring member.

Fig. 2 is an enlarged elevational view looking in the direction indicated by the arrow 2 in Fig. 1.

Fig. 3 is a cross section taken on the line 3—3 of Fig. 2.

Fig. 4 is a cross section taken on the line 4—4 of Fig. 2.

Fig. 5 is a sectional perspective showing the two parts of the ring in separated relation.

Fig. 6 is a vertical section taken through the upper portion of a worn or tapered cylinder, with the piston therein and with a piston ring of my improved construction seated in the piston.

Fig. 7 is a sectional view similar to Fig. 6 and showing the position occupied by my improved piston ring as the same enters the normal or unworn portion of the piston chamber.

Fig. 8 is a sectional view similar to Figs. 6 and 7 and showing the position the same occupies when the piston is below the tapered or worn upper portion of the piston chamber.

Referring by numerals to the accompanying drawing which illustrates a preferred embodiment of my invention, 10 designates the inner or upper member of the ring which is preferably formed of cast iron or other metal having a certain degree of resilience.

The body of this ring is substantially triangular in cross section with a vertically disposed inner face 11 and horizontally disposed upper and lower faces 12 and 13 respectively and which upper and lower faces are disposed in planes at right angles to the plane occupied by the inner face 11.

The width of the underface 13 of ring member 10, is considerably narrower than the upper face 12 and on the opposite side of the ring body 10 from the vertical inner face 11, said body is provided with a narrow inclined face 14, a pair of inclined faces 15 and 16 and a horizontally disposed face 17 that forms a ledge or shoulder.

The narrow inclined face 14 is formed so that it corresponds with the inclination of the worn or tapered upper portion of the cylinder wall and inclined face 15 extends downwardly and rearwardly from the lower edge of the narrow inclined face 14 toward the rear wall of the ring member.

Inclined face 16 is considerably narrower than inclined face 15, said faces being parallel with each other, and the lower and narrower inclined face 16 extends from the edge of the narrow bottom face 13 upwardly to the horizontal plane occupied by the lower end of the wider inclined face 15 and the lower end of said inclined face 15 and the upper end of the narrower inclined face 16 are united by the horizontally disposed face 17 that occupies a plane parallel with the upper and lower faces 12 and 13 of the inner ring member 10.

Inner ring member 10 is split and in its normal or fully expanded condition, the ends of said split ring member are spaced apart as illustrated in Fig. 1.

The outer or lower ring member 18 is split with its ends normally spaced apart as illustrated in Fig. 1 and said outer ring member is preferably formed of wear resisting metal such as bronze and having a relatively small degree of resiliency.

Outer ring member 18 is substantially triangular in cross section and the underface 19 thereof is horizontally disposed so that when the outer ring member is associated with the inner ring member, the horizontally disposed underface 19 occupies the same horizontal plane with the narrow outer face 13 of inner ring member 10.

The outer face 20 of outer ring member 18 is inclined to correspond with the inclination of the narrow outer face 14 of inner ring member 10 and with the inclination of the worn or tapered upper portion of the piston chamber and the upper portion of this inclined outer face 20 is rounded or beveled as designated by 21, so that when the two ring members are properly associated a circumferential groove or chamber 22 is formed between the beveled or rounded face 21 and the upper portion of the inclined face 15 of inner ring member 10.

The ends of this circumferential groove or chamber terminate adjacent to the ends of ring member 18 and between the ends of said circumferential chamber and the ends of the ring members are formed short lugs 23 that completely fill the space between the ring members at the ends of said groove or chamber.

Extending downwardly from the upper edge of the rounded or beveled corner 21, is an inclined face 24 which when the ring members are assembled, bears directly against inclined face 15 of the inner ring member 10 and formed on the inner lower portion of ring member 18 is a correspondingly inclined face 25 which when the ring members are assembled, bears directly against inclined face 16 on ring member 10.

Connecting the lower edge of inclined face 24, with the upper edge of inclined face 25, is a flat horizontally disposed face or shoulder 26 that occupies a plane parallel with the underface 19 of the outer ring member and this face or shoulder 26 bears directly against the flat face 17 on inner ring member 10 when the same are properly associated.

Formed integral with the inner ring member 10 and projecting radially outward from the lower inclined face 16, is a lug 27 that projects between the ends of outer ring member 18, so as to limit the relative circumferential movement between the two rings and the outer face 28 of this lug is inclined to correspond with the inclination of the outer face 14 of inner ring member and outer face 20 of the outer ring member.

When the parts of my improved ring are properly assembled and positioned in a piston ring groove, the inclined faces 15 and 24, 17, and 26 and 16 and 25 are in direct contact with each other and the lug 27 projects outwardly between the ends of the outer ring member 18.

The assembled ring is placed in a piston ring groove G and the resiliency of inner ring member 10 causes the same to expand so that the inclined outer face 14 of said inner ring or the upper edge thereof is in direct contact with the face of the cylinder wall surrounding the piston chamber, as illustrated in Figs. 6, 7, and 8.

During the upward travel of the piston on the compression stroke, the increasing pressure of the gaseous charge above the piston and the frictional engagement of the outer faces of the ring members with the cylinder wall maintains the ring in the lower portion of the groove G, as illustrated in Fig. 6 with pressure prevailing on top and behind inner ring member 10 and this pressure also prevails in the circumferential chamber 22 for the reason that pressure enters said circumferential chamber through the gap between the ends of inner ring member 10 and the pressure in this circumferential chamber is prevented from escaping therefrom by the lugs or blocks 23 that fill said chamber at the ends of outer ring member 18.

The pressure trapped in circumferential chamber 22 exerts downward force upon outer ring member 18 so as to effectively seal the joint between the flat contacting faces 17 and 26.

As the piston travels upwardly through the worn tapered portion of the piston chamber on the compression stroke, the ring will be forced outwardly, due to the increasing pressure and the tendency of inner ring member 10 to expand so that the inclined outer faces 14 and 20 of the ring members will engage the surface of the cylinder wall to provide a fluid pressure tight joint or seal and thereby effectively prevent the loss of compression downwardly between the surface of the piston and the adjacent surface of the cylinder wall.

As the gaseous charge is ignited, the piston will be moved downward on its power stroke and during the downward travel of the piston, the outer faces of the piston ring members will remain in engagement with the face of the cylinder wall as a result of the high pressure prevailing in the piston ring groove above and behind inner ring member 10.

As the piston moves downwardly in the cylinder to a point where the upper outer edge of the inner ring member 10 leaves the worn tapered upper portion of the cylinder wall, said inner ring member 10 will be contracted due to the engagement of the upper edge of face 14 with the face of the cylinder wall and the pressure prevailing in circumferential chamber 22 will exert downward and inner pressure upon outer ring member 18 to cause the same to hug the inner ring member as illustrated in Fig. 7 and as the piston passes downwardly through the unworn portion of the piston chamber the pressure prevailing in chamber 22 will move outer ring member 18 against inner ring member 10, so that the outer surface 20 of said outer ring member moves out of contact with the cylinder wall as illustrated in Fig. 8, with the result that the pressure trapped in circumferential chamber 22 will pass downwardly between the outer face of outer ring member 18 and the face of the cylinder wall and any accumulation of oil between the piston skirt and the groove in which the piston ring is seated will be blown downwardly and inwardly through vents V that are provided in the piston wall immediately below the piston ring groove.

During the upward exhaust stroke of the piston, the ring will maintain its position with its underface or faces in contact with the bottom face of the groove due to the pressure developed by the resistance of the gases that are being forced out through the exhaust ports by the upwardly traveling piston and after the piston travels upwardly through the worn tapered portion of the piston chamber, the inclined outer faces of the ring members will make contact with the tapered surface so as to produce a fluid pressure tight joint during the exhaust stroke.

During the downward travel of the piston on the suction stroke, the piston ring as a result of friction developed between the outer faces of the ring member and the cylinder wall, will move to its upward limit of movement in the piston ring groove and due to the expansion of the inner ring member 10, the outer faces of the two ring members will be maintained in contact with the face of the cylinder wall.

During this suction stroke a certain amount of liquid lubricant will enter the piston ring groove to occupy the space behind and below the ring and as the piston continues in its downward movement and the ring is contracted as it travels into the normal or unworn portion of the piston chamber whatever oil has accumulated in the groove behind the ring, will be forced downward, thence through the space beneath the ring and thence through vents V in the piston skirt.

During the confinement or duration of the expansive pressures within the circumferential chamber 21 while the piston ring is traveling through the worn or tapered portion of the piston chamber, such expansive pressure exerts a downward force upon the outer ring member and this force causes the flat surface 26 on the outer ring member to bear on flat surface 17 of the inner ring member so as to produce a highly effective fluid pressure tight joint between the two ring members and to securely maintain the same in assembled relation.

I have ascertained by research and experiments that the frictional contact between the contacting faces 17 and 26 per square inch is considerably greater due to the smaller contacting areas, than the frictional contact between the inclined surfaces 15 and 24 and 16 and 25.

As a result of the pressure trapped and prevailing in the circumferential groove on chamber 22 and the pressure behind and on top of inner ring member 10 during compression, power and exhaust strokes of the piston, the piston ring members are firmly held together and said members cooperate to produce a piston ring that is highly effective in maintaining a fluid pressure tight joint between the piston and cylinder wall and for effectively preventing the flow of oil past the piston particularly where the pistons are operating in worn tapered piston chambers.

I prefer to form the outer ring member 18 of bronze, for I have ascertained by tests and experiments that after a bronze ring has been in use a short time it becomes annealed and hardened to approximately the same degree as cast iron, which result is due to the heat and friction that prevail while the ring is in service and the bronze ring when thus hardened more readily conforms to the shape of the inner ring and to the cylinder wall and the resistance to wear is materially increased.

The bronze rings when new, are relatively soft and after being installed a certain minute portion of the bronze ring will be worn off by friction and the worn-off particles will fill the surface pores of the cylinder wall and such action materially decreases friction and subsequent wear.

Further, the bronze rings after being annealed and hardened have increased resistance to fracture.

Thus it will be seen that I have provided a piston packing ring that is relatively simple in construction, inexpensive of manufacture and very effective in performing the functions for which it is intended.

It will be understood that minor changes in the size, form and construction of the various parts of my improved piston ring may be made and substituted for those herein shown and described without departing from the spirit of my invention, the scope of which is set forth in the appended claims.

I claim as my invention:

1. A piston packing ring, comprising a split inner ring member that is substantially triangular in cross section and provided with parallel upper and lower faces, the lower face being narrower than the upper face, said inner ring member having on its outer upper circumference a relatively narrow outer face that is inclined vertically, said inner member having a pair of correspondingly inclined faces offset from each other and arranged between the narrow inclined outer face of said member and the narrow bottom face thereof, an upwardly presented shoulder connecting the adjacent ends of said offset inclined faces, a split outer ring member that is substantially triangular in cross section and having a flat underface, an outer face that is vertically inclined to correspond with the inclination of the narrow inclined outer face so that the width of the lower face of the assembled ring is less than the width of the upper face, said outer ring member provided on its inner face with a pair of correspondingly inclined offset faces, a horizontally disposed shoulder connecting the adjacent edges of the offset inclined faces on said outer ring member, which shoulder overlies the corresponding shoulder on the inner ring member when the two members are assembled, a short circumferentially disposed lug projecting outwardly from the lower portion of said inner ring member diametrically opposite from the split therein, the outer face of which lug is inclined to correspond with the inclination of the outer face of said inner ring member, and which lug occupies a position between the ends of the split inner ring when the two rings are assembled.

2. A piston packing ring, comprising a split inner ring member that is substantially triangular in cross section and provided with parallel upper and lower faces, the lower face being narrower than the upper face, said inner ring member having on its outer upper circumference a relatively narrow outer face that is inclined vertically, said inner member having a pair of correspondingly inclined faces offset from each other and arranged between the narrow inclined outer face of said member and the narrow bottom face thereof, an upwardly presented shoulder connecting the adjacent ends of said offset inclined faces, a split outer ring member that is substantially triangular in cross section and having a flat underface, an outer face that is vertically inclined to correspond with the inclination of the narrow inclined outer face so that the width of the lower face of the assembled ring is less than the width of the upper face, said outer ring member provided on its inner face with a pair of correspondingly inclined offset faces, a horizontally disposed shoulder connecting the adjacent edges of the offset inclined faces on said outer ring member, which shoulder overlies the corresponding shoulder on the inner ring member when the two members are assembled, the upper outer edge of said outer ring member being cut away to form a circumferential chamber between the inclined outer faces of the two ring members, the ends of which circumferential chamber are closed adjacent to the gap between the ends of said outer ring member, a short circumferentially disposed lug projecting outwardly from the lower portion of said inner ring member diametrically opposite from the split therein, the outer face of which lug is inclined to correspond with the inclination of the outer face of said inner ring member, and which lug occupies a position between the ends of split inner ring when the two rings are assembled.

3. A piston packing ring, comprising a split inner ring member, a split outer ring member, both ring members being substantially triangular in cross section, overlapping shoulders formed on the contacting faces of the two ring members to prevent relative vertical movement, the outer faces of both ring members being correspondingly inclined vertically so that the width of the lower face of the assembled ring is less than the width of the upper face, a short circumferentially disposed lug projecting outwardly from the lower portion of the inner ring member below the horizontally disposed shoulder thereon, and diametrically opposite from the split in said inner ring member, the outer face of which lug is inclined to correspond with the inclination of the outer faces of both ring members, and which lug is positioned between the split ends of the outer ring member when the two ring members are assembled.

BYRON P. LAYNE.